(12) United States Patent
Choi et al.

(10) Patent No.: US 12,166,235 B2
(45) Date of Patent: Dec. 10, 2024

(54) SEPARATOR AND ELECTROCHEMICAL DEVICE USING THE SAME

(71) Applicants: SK Innovation Co., Ltd., Seoul (KR); SK ie technology Co., Ltd., Seoul (KR)

(72) Inventors: Jae Suk Choi, Daejeon (KR); Seon Ju Lim, Daejeon (KR); Sang Yoon Ji, Daejeon (KR); Hye Jin Park, Daejeon (KR); Seung Woo Lee, Daejeon (KR); Chang Q Lee, Daejeon (KR); Young Eun Cheon, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 0 days.

(21) Appl. No.: 18/183,839

(22) Filed: Mar. 14, 2023

(65) Prior Publication Data
US 2023/0299421 A1 Sep. 21, 2023

(30) Foreign Application Priority Data
Mar. 15, 2022 (KR) .......................... 10-2022-0031988

(51) Int. Cl.
*H01M 50/446* (2021.01)
*H01M 10/052* (2010.01)
(Continued)

(52) U.S. Cl.
CPC ....... *H01M 50/434* (2021.01); *H01M 10/052* (2013.01); *H01M 10/0525* (2013.01); *H01M 50/403* (2021.01); *H01M 50/446* (2021.01); *H01M 50/449* (2021.01); *H01M 50/451* (2021.01); *H01M 50/489* (2021.01)

(58) Field of Classification Search
CPC ............ H01M 50/446; H01M 50/449; H01M 50/451; H01M 50/489; H01M 50/40; H01M 50/434; H01M 50/409; H01M 50/443; H01M 50/403; H01M 10/052; H01M 10/0525
See application file for complete search history.

(56) References Cited

U.S. PATENT DOCUMENTS 6,046,268 A * 4/2000 Ochoa ..................... H01M 4/13
429/231.95
2010/0285371 A1 * 11/2010 Lee ..................... H01M 50/446
356/402

(Continued)

FOREIGN PATENT DOCUMENTS

CN 108034418 B 1/2020
KR 10-2020-0017089 A 2/2020

OTHER PUBLICATIONS

Extended European Search Report for European Patent Application No. 23161629.3, mailed Aug. 22, 2023 (6 pages).

*Primary Examiner* — Jeremiah R Smith
(74) *Attorney, Agent, or Firm* — Perkins Coie LLP

(57) ABSTRACT

Provided are a separator and an electrochemical device using the same, in particular, a separator having significantly low heat shrinkage even at a high temperature and also significantly improved adhesive strength by including inorganic particles having specific fluorescence properties in the separator, and an electrochemical device using the same.

20 Claims, 1 Drawing Sheet

(51) Int. Cl.
*H01M 10/0525* (2010.01)
*H01M 50/403* (2021.01)
*H01M 50/434* (2021.01)
*H01M 50/449* (2021.01)
*H01M 50/451* (2021.01)
*H01M 50/489* (2021.01)

(56) References Cited

U.S. PATENT DOCUMENTS

| | | | |
|---|---|---|---|
| 2011/0176661 A1* | 7/2011 | Li | H01M 10/4235 429/246 |
| 2011/0206919 A1 | 8/2011 | Nagai et al. | |
| 2013/0316230 A1* | 11/2013 | Liu | H01M 4/38 429/211 |
| 2016/0248066 A1* | 8/2016 | Shi | H01M 50/451 |
| 2019/0067748 A1 | 2/2019 | Saeki et al. | |
| 2019/0221852 A1* | 7/2019 | Nishimura | H01M 10/4235 |
| 2019/0237732 A1* | 8/2019 | Hu | H01M 50/417 |
| 2019/0259999 A1* | 8/2019 | Nishijima | B32B 19/045 |
| 2019/0280270 A1* | 9/2019 | Hayashi | H01M 50/46 |
| 2020/0395642 A1* | 12/2020 | Hwang | H01M 50/557 |
| 2022/0037741 A1* | 2/2022 | Lee | H01M 50/42 |
| 2022/0359874 A1* | 11/2022 | Bie | H01M 4/5825 |
| 2023/0178853 A1* | 6/2023 | Noh | H01M 50/414 429/246 |
| 2023/0223659 A1* | 7/2023 | Lee | H01M 10/052 429/247 |

* cited by examiner

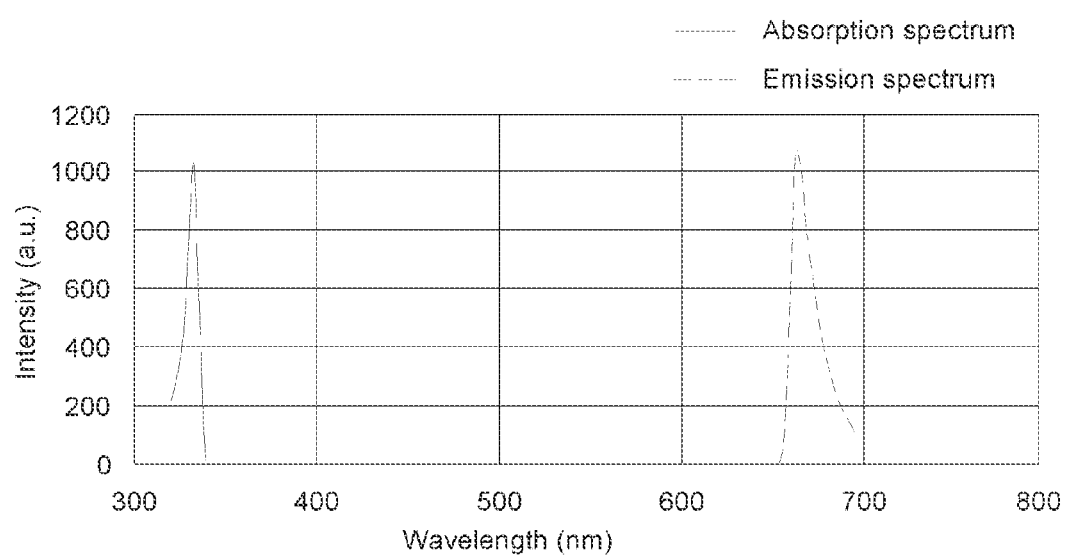

SEPARATOR AND ELECTROCHEMICAL DEVICE USING THE SAME

CROSS-REFERENCE TO RELATED APPLICATIONS

This patent document claims the priority and benefits of Korean Patent Application No. 10-2022-0031988, filed on Mar. 15, 2022, the disclosure of which is incorporated herein by reference in its entirety.

TECHNICAL FIELD

The disclosed technology relates to a separator for electrochemical devices such as batteries using the same.

BACKGROUND

In recent years, secondary batteries are becoming higher in capacity and larger, and under these conditions, a possibility of ignition and explosion occurring in the abnormal behavior of the battery is several times to ten times greater than before. Therefore, it becomes a very important factor to secure battery safety.

SUMMARY

The disclosed technology can be implemented in some embodiments to provide a separator for an electrochemical device such as a battery and such a separator can include, in some implementations, inorganic particles having specific fluorescence properties in an inorganic particle layer, thereby having improved heat resistance to prevent ignition or rupture by an abnormal phenomenon such as a rapid temperature rise.

The disclosed technology can be implemented in some embodiments to provide a separator having improved adhesive strength between a porous substrate and an inorganic particle layer and between inorganic particles of the inorganic particle layer, by including inorganic particles having specific fluorescence properties in the inorganic particle layer of the separator.

The disclosed technology can be implemented in some embodiments to provide an electrochemical device which is chemically stable and has excellent electrical properties, by including the separator.

The disclosed technology can be implemented in some embodiments to provide an electrochemical device in which a chemical reaction with an electrolyte solution of a battery is decreased, in which the dissolution of an organic binder in the electrolyte is excluded or decreased, and in which there is no problem such as closure of a porous layer or an increased volume of a battery, by using inorganic particles and not using an organic binder or using a significantly small content of an organic binder.

In one general aspect, a separator, configured to be disposed between an anode and a cathode, includes: a porous substrate, and an inorganic particle layer disposed on one or both surfaces of the porous substrate, wherein the inorganic particle layer includes first inorganic particles and second inorganic particles, and the first inorganic particles have a fluorescence retention rate represented by the following Equation 1 of 85% or more:

$$\text{Fluorescence retention rate (\%)} = I_{100}/I_0 \times 100 \quad \text{[Equation 1]}$$

wherein $I_0$ is a maximum fluorescence intensity in the range of 600 nm to 750 nm which is detected when a solution obtained by diluting an upper 10 vol % of aliquot of an aqueous slurry including 5 wt % of the first inorganic particles by a dilution factor of 500 is irradiated with an incident light having a wavelength in a range of 300 nm to 350 nm, and $I_{100}$ is a maximum fluorescence intensity in the range of 600 nm to 750 nm which is detected when a solution obtained by allowing the slurry to stand for 100 hours and then diluting an upper 10 vol % of aliquot of the slurry by a dilution factor of 500 is irradiated with an incident light having a wavelength in a range of 300 nm to 350 nm.

In an exemplary embodiment, the first inorganic particles may have a fluorescence in the wavelength region of 600 nm to 750 nm to the incident light in the wavelength region of 300 nm to 350 nm in a solution phase.

In an exemplary embodiment, the first inorganic particles may be one or two or more selected from sheet-shaped inorganic particles and rod-shaped inorganic particles.

In an exemplary embodiment, the sheet-shaped first inorganic particles may have a long diameter and a short diameter in a range of 0.1 nm to 200 nm, respectively, and a thickness in a range of 0.1 nm to 50 nm. For a given sheet-shaped first inorganic particle, the terms "long" and "short" are relative terms, so that size of the longer diameter is larger than the shorter diameter in the indicated size range. The size indications may be averaged sizes. The size of the sheet-shaped first inorganic particle may be measured by transmission electron microscopy (TEM), for instance by statistical observation of a suitable number of randomly selected particles, such as e.g. 20 particles.

In an exemplary embodiment, the rod-shaped first inorganic particles may have a length in a range of 0.1 nm to 450 nm and a diameter in a range of 0.1 nm to 100 nm. For a given rod-shaped inorganic particle, the size of the length is larger than the diameter in the indicated size range. The size indications may be averaged sizes. The size of the rod-shaped first inorganic particle may be measured by transmission electron microscopy (TEM), for instance by statistical observation of a suitable number of randomly selected particles, such as e.g. 20 particles.

In an exemplary embodiment, the first inorganic particles may include any one or a combination of two or more selected from metal, carbon, metal oxides, metal nitride, metal carbides, metal carbonates, metal hydrides, and metal carbonitrides.

In an exemplary embodiment, the first inorganic particles may include one or a combination of two or more selected from boehmite, pseudo-boehmite, $Ga_2O_3$, SiC, $SiC_2$, quartz, NiSi, Ag, Au, Cu, Ag—Ni, ZnS, $Al_2O_3$, $TiO_2$, $CeO_2$, MgO, NiO, $Y_2O_3$, CaO, $SrTO_3$, $SnO_2$, ZnO, and $ZrO_2$.

In an exemplary embodiment, the second inorganic particles may include any one or a combination of two or more selected from metal oxides, metal nitride, metal carbides, metal carbonates, metal hydrides, and metal carbonitrides.

In an exemplary embodiment, the second inorganic particles may include one or a combination of two or more selected from boehmite, pseudo-boehmite, $Al_2O_3$, $TiO_2$, $CeO_2$, MgO, NiO, $Y_2O_3$, CaO, $SrTO_3$, $SnO_2$, ZnO, and $ZrO_2$.

In an exemplary embodiment, the second inorganic particles may have a D50 value in a range of 0.001 μm to 20 μm.

In an exemplary embodiment, the first inorganic particles may be included at 0.1 parts by weight to 30 parts by weight with respect to 100 parts by weight of the second inorganic particles.

In an exemplary embodiment, the separator may have a heat shrinkage rate (%) at 170° C. of 10% or less. The heat shrinkage rate (%) may be measured as described below.

In an exemplary embodiment, the separator may have a weight change rate (%) of the inorganic particle layer of 10% or less by a strawboard adhesion test.

The strawboard adhesion test is performed by placing a black strawboard having a size of 2 cm×10 cm on a separator having a size of 5 cm×10 cm, pulling the strawboard horizontally at a speed of 0.1 m/s in a state of pressing the strawboard with a force of 10 N, and evaluating the amount of particles sticking to the strawboard at that time.

In an exemplary embodiment, a peel strength between the porous substrate and the inorganic particle layer may be 25 gf/15 mm or more. The peel strength may be measured as described below.

In an exemplary embodiment, the inorganic particle layer may further include an organic binder.

In an exemplary embodiment, the organic binder may be included at 5 parts by weight or less with respect to a total of 100 parts by weight of the first inorganic particles, the second inorganic particles, and the organic binder.

In another general aspect, an electrochemical device includes: a positive electrode, a negative electrode, the separator described above, and an electrolyte.

In an exemplary embodiment, the electrochemical device may be a lithium secondary battery.

In still another general aspect, a method of manufacturing a separator and includes: coating one or both surfaces of a porous substrate with a dispersion including first inorganic particles and second inorganic particles; and drying the coated porous substrate to form an inorganic particle layer, wherein the first inorganic particles have a fluorescence retention rate represented by Equation 1 of 85% or more.

Other features and aspects will be apparent from the following detailed description, the drawings, and the claims.

BRIEF DESCRIPTION OF THE DRAWINGS

FIG. 1 is an absorption spectrum and an emission spectrum of first inorganic particles prepared in Preparation Example 1.

DETAILED DESCRIPTION

The embodiments described in the present specification may be modified in many different forms, and the technology based on some embodiments is not limited to the embodiments set forth herein. In addition, the embodiments of an exemplary embodiment are provided so that the disclosed technology will be described in more detail to a person with ordinary skill in the art.

In addition, the singular form used in the specification and claims appended thereto may be intended to include a plural form also, unless otherwise indicated in the context. Furthermore, unless explicitly described otherwise, "comprising" any components will be understood to imply the inclusion of other components but not the exclusion of any other components.

In addition, the numerical range used in the present specification includes all values within the range including the lower limit and the upper limit, increments logically derived in a form and span in a defined range, all double limited values, and all possible combinations of the upper limit and the lower limit in the numerical range defined in different forms. Unless otherwise defined in the specification of the disclosed technology, values which may be outside a numerical range due to experimental error or rounding of a value are also included in the defined numerical range.

In some implementations, it will be understood that when an element such as a layer, film, region, or substrate is referred to as being "on" or "above" another element, it can be directly on the other element or intervening elements may also be present.

In some implementations, the terms such as "first" and "second" used in the present specification may be used to describe various constituent elements, but the constituent elements are not to be limited to the terms. The terms are only used to differentiate one constituent element from other constituent elements.

In addition, inorganic particles included in the separator based on some embodiments are used in the sense of including first inorganic particles and second inorganic particles.

In some implementations, a "sheet shape" means that a thickness is smaller than a long diameter or a short diameter in a particle shape, and may refer to a sheet shape, a thin shape, and the like.

In some implementations, a long diameter of the sheet-shaped inorganic particles refers to a longest length of the particles, a short diameter of the sheet-shaped inorganic particles refers to a longest length in a direction orthogonal to the axis of a long diameter, and those terms may be applied identically to inorganic particles of which the size is expressed by the long diameter, the short diameter, and the thickness.

In some implementations a "rod shape" refers to being extended in any one direction in a particle shape, which is a wire shape or a shape having a shorter extended length than a fibrous shape, and may refer to a rod shape or a columnar shape.

In some implementations, the length of the rod-shaped inorganic particles refers to a length in a direction in which the particles extend, the diameter refers to a length in a direction orthogonal to a direction of measuring the length, and those terms may be applied identically to inorganic particles of which the size is expressed by the length and the diameter.

In some implementations, a long diameter, a short diameter, a thickness, a length, and a diameter are determined from averages of values obtained by measuring 20 particles randomly selected from each of five images obtained by a transmission electron microscope (TEM, JEOL Ltd, JEM-2100F).

In some implementations, the size of particles such as second inorganic particles other than first inorganic particles and organic particles refers to D50, which is a particle diameter when a cumulative volume is 50% from the smallest particle diameter in the particle size distribution measurement by a laser scattering method. Here, for D50, the particle size distribution may be measured by collecting a sample according to a KS A ISO 13320-1 standard and using Mastersizer 3000 from Malvern Panalytical Ltd. Specifically, a volume density may be measured after particles are dispersed in ethanol as a solvent, using an ultrasonic disperser, if necessary.

In some implementations, "boehmite" is represented by the chemical formula AlO(OH), and means that a sheet structure is formed by bonding an Al—(O,OH) octahedron.

In some implementations, "pseudo-boehmite" is represented by the chemical formula AlO(OH), and means that a microcrystalline boehmite-like structure is formed due to a high moisture content.

The disclosed technology can be implemented in the field of secondary batteries or rechargeable batteries that widely used in electric vehicles, uninterruptible power supplies, battery storage power stations, and others including battery power storage for solar panels, wind power generators and other green tech power generators. Specifically, the disclosed technology can be implemented in some embodiments to provide a separator for an electrochemical device such as a battery, thereby mitigating climate change. Lithium secondary batteries based on the disclosed technology can be used to address various adverse effects such as air pollution and greenhouse emissions by powering electric vehicles (EVs) as alternatives to vehicles using fossil fuel based engines and by providing battery based energy storage systems (ESS) to store renewable energy such as solar power and wind power.

In implementing the disclosed technology to prevent undesired ignition or explosion in operating a battery, inorganic particles and a polymer-based organic binder may be included in the entire area of a porous substrate prepared using a polyolefin. In such an implementation, a composite separator includes a porous inorganic particle layer such that the inorganic particles are connected to each other by the organic binder and also adhere to the porous substrate by the organic binder.

In some implementations, a relatively large amount of the organic binder is used to have sufficient adhesive strength. Accordingly, a chemical reaction between an electrolyte solution of a battery and organic binder components may cause deformation of binder components or gas production by the reaction, or gas leaks by heat may reduce a battery life.

In addition, an excessive amount of an organic binder is dissolved in an electrolyte and is eluted to cause various problems. For example, performance of an electrolyte is deteriorated, the organic binder is swollen by the electrolyte solution to close a porous layer, or the volume of a battery is increased.

The disclosed technology can be implemented in some embodiments to provide a new type of separator that can address the issues discussed above.

The disclosed technology can be implemented in some embodiments to solve the problems of the conventional separator having an inorganic particle layer described above. As a result, it was first recognized that in the case of a separator having an inorganic particle layer formed in which inorganic particles including inorganic particles showing specific fluorescence properties are connected to each other to form pores on one or both surfaces of a porous substrate, a separator having excellent heat resistance and adhesion may be provided, though a polymer-based organic binder is not used or used in a small amount. The inorganic particle particles showing specific fluorescence may refer to inorganic particles showing the fluorescence properties, or inorganic particles having a specific size showing the fluorescence properties.

In some implementations, the inorganic particles showing specific fluorescence properties are referred to as "first inorganic particles", and the inorganic particles which do not show the properties and may be used as a main component forming an inorganic particle layer are referred to as "second inorganic particles". Specifically, the first inorganic particles may have a fluorescence in the wavelength range of 600 nm to 750 nm when irradiated with an incident light in the wavelength region of 300 nm to 350 nm in a solution phase, whereas the second inorganic particles may not have such fluorescence. In addition, the second inorganic particles may not have a fluorescence retention rate defined herein of less than 85%, and more specifically, the fluorescence retention rate may be 0.

In some implementations, a separator may include: a porous substrate, and an inorganic particle layer disposed on one or both surfaces of the porous substrate, wherein the inorganic particle layer includes first inorganic particles and second inorganic particles, and the first inorganic particles have a fluorescence retention rate represented by the following Equation 1 of 85% or more:

$$\text{Fluorescence retention rate (\%)} = I_{100}/I_0 \times 100 \qquad \text{[Equation 1]}$$

wherein $I_0$ is a maximum fluorescence intensity in the range of 600 nm to 750 nm which is detected when a solution obtained by diluting an upper 10 vol % of aliquot of an aqueous slurry including 5 wt % of the first inorganic particles by a dilution factor of 500 is irradiated with an incident light having a wavelength in a range of 300 nm to 350 nm, and $I_{100}$ is a maximum fluorescence intensity in the range of 600 nm to 750 nm which is detected when a solution obtained by allowing the slurry to stand for 100 hours and then diluting an upper 10 vol % of aliquot of the slurry by a dilution factor of 500 is irradiated with an incident light having a wavelength in a range of 300 nm to 350 nm.

Here, the fluorescence intensity ($I_0$ and $I_{100}$) may be detected from an aqueous slurry including the first inorganic particles before being coated on the separator, and also may be detected from an aqueous slurry including the inorganic particle layer obtained by separating the porous substrate from the separator coated with the first inorganic particles, and also from an aqueous slurry including the first inorganic particles included in the inorganic particle layer obtained by separating the porous substrate from the separator.

In addition, in some embodiments, the first inorganic particles may have a fluorescence in the wavelength range of 600 nm to 750 nm to an incident light in the wavelength range of 300 nm to 350 nm in a solution phase. Specifically, the fluorescence may be measured using a fluorescence spectrophotometer (Hitachi, F-7000).

Conventionally, when an inorganic particle layer is laminated on a porous substrate, inorganic particles are not dispersed well unless a polymer-based organic binder is used in an excessive amount, so that an inorganic particle layer having pores formed by connecting inorganic particles to each other may not be prepared, and even when excessive energy is input to disperse inorganic particles, sufficient adhesive strength between inorganic particles or between an inorganic particle layer and a porous substrate may not be secured.

However, in the separator based on some embodiments, pores may be formed by connecting inorganic particles including the second inorganic particles to each other by the first inorganic particles, though an organic binder is not used. In an exemplary embodiment, it is considered that the separator may show high adhesion since the inorganic particles and/or the inorganic particle layer and the porous substrate may be connected or anchored by the first inorganic particles.

In an exemplary embodiment, the inorganic particle layer may be formed on 90% or more of the entire area of one or both surfaces of the porous substrate, and specifically 95% or more of the entire area of one or both surfaces of the porous substrate. More specifically, the inorganic particle layer may be formed on 100% except in the case in which fine defects occur, of the entire area of each surface of one or both surfaces of the porous substrate. The inorganic particle layer has pores formed between the inorganic particles which are adjacent to each other.

The separator based on some embodiments may have better bonding strength between particles included in the inorganic particle layer and better adhesive strength between the porous substrate and the inorganic particle layer as compared with a conventional separator, though an organic binder is not used.

In some embodiments, as compared with an organic/inorganic composite separator including an excessive amount of a conventional polymer-based organic binder, when the inorganic particles having specific fluorescence properties described above are included, a porous inorganic particle layer in which strong bonds are formed between inorganic particles and between inorganic particles and a porous substrate may be provided, though an organic binder is not used, and thus, heat resistance of the separator is further improved, and a new separator which may prevent ignition and rupture by an abnormal phenomenon such as a rapid temperature rise may be provided.

The separator based on some embodiments does not cause a problem such as pore blockage and expansion, has excellent ion migration to have no impediment in migration of ions such as a lithium ion, and may have significantly improved electrical properties such as charge and discharge capacity or efficiency of a battery.

In addition, an inorganic particle layer having significantly increased heat resistance and chemical resistance and being formed of only inorganic materials may be obtained, and adhesive strength between inorganic particles included in the inorganic particle layer or between the porous substrate and the inorganic particle layer may be sufficiently secured by the first inorganic particles having fluorescence properties.

Accordingly, the separator based on some embodiments of the disclosed technology may have all of excellent thermal stability, excellent electrochemical stability, excellent lithium ion conductivity, excellent prevention properties against electrolyte solution contamination, and an excellent electrolyte solution impregnation rate effect. The inorganic particle layer may be formed by including the first inorganic particles on one or both surfaces of a porous substrate, for example, a polyolefin-based porous substrate, in which the first inorganic particles may have a fluorescence retention rate represented by the following Equation 1 of 85% or more:

$$\text{Fluorescence retention rate } (\%) = I_{100}/I_0 \times 100 \quad \text{[Equation 1]}$$

wherein $I_0$ is a maximum fluorescence intensity in the range of 600 nm to 750 nm which is detected when a solution obtained by diluting an upper 10 vol % of aliquot of an aqueous slurry including 5 wt % of the first inorganic particles by a dilution factor of 500 is irradiated with an incident light having a wavelength in a range of 300 nm to 350 nm, and $I_{100}$ is a maximum fluorescence intensity in the range of 600 nm to 750 nm which is detected when a solution obtained by allowing the slurry to stand for 100 hours and then diluting an upper 10 vol % of aliquot of the slurry by a dilution factor of 500 is irradiated with an incident light having a wavelength in a range of 300 nm to 350 nm.

In some embodiments, when the first inorganic particles satisfying the fluorescence retention rate are used, a fixation effect of inorganic particles included in the inorganic particle layer, a bonding force between the inorganic particle layer and the porous substrate, and the like are excellent, and the physical properties to be desired in the disclosed technology may be more highly implemented. Specifically, the first inorganic particles may have the fluorescence retention rate represented by Equation 1 of 88% or more, 90% or more, or 94% or more.

In some embodiments, the inorganic particle layer of the separator is disposed on one or both surfaces of the porous substrate, and inorganic particles including the second inorganic particles are connected to each other by the first inorganic particles to form a porous structure having pores formed therein. Though the inorganic particle layer does not use a polymer-based organic binder, the problems of the organic/inorganic composite separator including an excessive amount of the conventional organic binder may be solved.

In some embodiments, when an electrochemical device using the separator is manufactured, the separator is not easily ruptured inside the battery by excessive conditions due to internal or external factors such as high temperature, overcharging, and external shock, and battery safety may be further improved, as compared with the conventional organic/inorganic composite separator.

In some embodiments, the first inorganic particles may have fluorescence properties in the wavelength range of 600 nm to 750 nm, 600 nm to 700 nm, 650 nm to 750 nm, or 650 nm to 700 nm to an incident light in the wavelength range of 300 nm to 350 nm. An example of the incident light may be a light having a wavelength of 332 nm, but is not limited thereto.

In some embodiments, the first inorganic particles may be one or two or more selected from sheet-shaped inorganic particles and rod-shaped inorganic particles, but are not limited thereto.

When the first inorganic particles have a shape such as a sheet shape or a rod form having a high surface area, while expressing specific fluorescence properties, adhesive strength may be further increased by a high surface contact between the first inorganic particles and the second inorganic particles. Though the reason is not clear, for example, it is considered that a chemical bond such as a van der Waals bond may be formed more smoothly, a tangle phenomenon between the second inorganic particles occurs more smoothly by the first inorganic particles, and the second inorganic particles are in contact with each other and strongly fixed to form pores in the layer more smoothly.

That is, in the inorganic particle layer, the second inorganic particles are fixed to each other by a chemical secondary bond or a tangle phenomenon and are easily released, and the adhesive strength of the second inorganic particles may be significantly improved.

In some embodiments, it is preferred that the first inorganic particles have a large surface area, in particular a surface area as large as possible. For example, the specific surface area may be 50 $m^2/g$ or more, 100 $m^2/g$ or more, 500 $m^2/g$ or more, 1000 $m^2/g$ or more, 3000 $m^2/g$ or more and 4000 $m^2/g$ or less, or in a range between each of the numerical values, specifically 300 $m^2/g$ to 4000 $m^2/g$, and more specifically 1000 $m^2/g$ to 4000 $m^2/g$ or more. When the specific surface area is in the above ranges, a chemical bond such as a van der Waals bond may be increased by the surface area to further increase entanglement between the first inorganic particles, entanglement between the first inorganic particles and a porous substrate surface, entanglement between the first inorganic particles and the second inorganic particles, or a physical bond. Hence, adhesive strength may be further increased. However, since a weak bond is also possible depending on the use, it is not necessarily limited thereto.

In some embodiments, the first inorganic particles may have, for example, a length (or a long diameter) in a range of 0.1 nm to 450 nm and a diameter (or a short diameter) in a range of 0.1 nm to 200 nm, but is not necessarily limited thereto.

In some embodiments, when the first inorganic particles are sheet-shaped inorganic particles, the long diameter and the short diameter may be in a range of 0.1 nm to 200 nm, specifically 0.1 nm to 150 nm, 0.1 nm to 100 nm, 0.1 nm to 80 nm, 0.1 nm to 50 nm, 1 nm to 30 nm, 5 nm to 25 nm, or 10 nm to 20 nm. However, it is not limited as long as the fluorescence properties are shown.

In some embodiments, when the first inorganic particles are sheet-shaped inorganic particles, the thickness may be 50 nm or less, specifically 20 nm or less, 15 nm or less, or 10 nm or less, more specifically 8 nm or less or 5 nm or less, and the lower limit may be, for example, 0.1 nm or 1 nm, but is not limited as long as the fluorescence properties are shown.

In some embodiments, when the first inorganic particles are rod-shaped inorganic particles, the length may be in a range of 0.1 nm to 450 nm and the diameter may be in a range of 0.1 nm to 100 nm, more specifically, the length may be 400 nm or less, 350 nm or less, 300 nm or less, 250 nm or less, 200 nm or less, 150 nm or less, 100 nm or less, 80 nm or less, or 60 nm or less and the diameter may be 80 nm or less, 70 nm or less, 50 nm or less, 30 nm or less, or 10 nm or less, and the lower limits of the length and the diameter may be 0.1 nm, 0.5 nm, or 1 nm, but are not limited thereto. In addition, a ratio between the length and the diameter is not limited, but for example, may be in a range of 5 to 500, but is not limited as long as the fluorescence properties are shown.

When the first inorganic particles have the long diameter, the short diameter, and the thickness, or the length and the diameter in the above ranges, a chemical bond such as a hydrogen bond as well as a van der Waals force and a dispersion force due to a high surface contact between the first inorganic particles and the second inorganic particles may be formed more smoothly. In addition, a tangle phenomenon between the second inorganic particles occurs more smoothly by the first inorganic particles, and the second inorganic particles are in contact with each other to be fixed more strongly, so that pores may be formed more smoothly in the layer. Accordingly, the physical properties such as a heat shrinkage rate, a peel strength, and a Gurley permeability of the separator may be improved.

In some implementations, the kind of first inorganic particles is not particularly limited as long as the first inorganic particles show the fluorescence properties and also are chemically stable in themselves under the battery operation conditions, and for example, the first inorganic particles may include any one or a combination of two or more selected from metal, carbon, metal oxides, metal nitrides, metal carbides, metal carbonates, metal hydrides, metal carbonitrides, and the like, and more specifically, may include one or a combination of two or more boehmite, pseudo-boehmite, $Ga_2O_3$, SiC, $SiC_2$, quartz, NiSi, Ag, Au, Cu, Ag—Ni, ZnS, $Al_2O_3$, $TiO_2$, $CeO_2$, MgO, NiO, $Y_2O_3$, CaO, $SrTiO_3$, $SnO_2$, ZnO, $ZrO_2$, and the like, but are not necessarily limited thereto.

The inorganic particle layer also has excellent adhesive strength with the surface of the porous substrate, and it is considered that this is because the first inorganic particles fix the second inorganic particles by a chemical secondary bond such as a hydrogen bond as well as a tangle phenomenon and/or a van der Waals force and a dispersion force, and also, the first inorganic particles penetrate into the micropores formed in the porous substrate and are anchored, thereby having an effect of being firmly fixed to the porous substrate.

Therefore, in the separator based on some embodiments of the disclosed technology, though the inorganic particle layer disposed on one or both surfaces of the porous substrate is formed of only inorganic materials, problems such as breakage or escape of inorganic particles may be avoided, and better adhesive strength may be shown.

In some embodiments of the disclosed technology, the second inorganic particles are, for example, spherical, prismatic, elliptical, or amorphous particles, or mixed forms thereof, and may include any one or a combination of two or more selected from metal oxides, metal nitrides, metal carbides, metal carbonate, metal hydrides, and metal carbonitrides, as those not showing the fluorescence properties, and specifically, may include any one or a combination of two or more selected from boehmite, pseudo-boehmite, $Al_2O_3$, $TiO_2$, $CeO_2$, MgO, NiO, $Y_2O_3$, CaO, $SrTiO_3$, $SnO_2$, ZnO, $ZrO_2$, and the like, but are electrochemically stable and are not necessarily limited thereto as long as they do not significantly affect battery performance.

The size of the second inorganic particles is not limited as long as the object of the disclosed technology is achieved, and may be for example, in a range of 0.001 μm to 20 μm, specifically 0.001 μm to 10 μm, but fluorescence properties like those of the first inorganic particles are not shown.

In some embodiments of the disclosed technology, the size of the second inorganic particles refers to an average particle diameter (D50), that is, the average particle diameter (D50) of the second inorganic particles may be in a range of 0.001 μm to 20 μm or 0.001 μm to 10 μm, and the second inorganic particles may include particles having different sizes from each other as long as they have the average particle diameter (D50) in the above range. For example, the second inorganic particles may include particles having the average particle diameter (D50) in a range of 0.001 μm to 1 μm and particles having the average particle diameter (D50) in a range of 0.5 μm to 10 μm, but are not limited thereto.

The first inorganic particles may be included at 0.1 parts by weight to 30 parts by weight with respect to 100 parts by weight of the second inorganic particles, and though it is not necessarily limited thereto, when the content range is satisfied, a bonding force between inorganic particles including the first inorganic particles and the second inorganic particles and between the inorganic particle layer and the porous substrate is excellent, thereby achieving the object of the disclosed technology. As to the content, more specifically, the first inorganic particles may be included at 1 part by weight to 30 parts by weight, 1 part by weight to 25 parts by weight, or 1 part by weight to 20 parts by weight with respect to 100 parts by weight of the second inorganic particles.

In some embodiments of the disclosed technology, it is preferred that the inorganic particle layer includes inorganic particles alone as particles, but the inorganic particle layer may be an inorganic particle layer which further includes organic particles, if necessary to form pores. Here, the kind of organic particles such as polyethylene particles is not particularly limited as long as the particles are electrochemically stable.

In addition, when the inorganic particle layer includes organic particles, the content may be 0.1 parts by weight to 40 parts by weight with respect to 100 parts by weight of the second inorganic particles, but the disclosed technology is not limited thereto.

In addition, the size of the organic particles may be used in the same range as the size of the second inorganic particles.

The inorganic particle layer of the disclosed technology may further include other commonly known additives in addition to the first inorganic particles and the second inorganic particles described above.

In some embodiments of the disclosed technology, the inorganic particle layer of the disclosed technology does not include an organic binder and may be formed of only inorganic materials, but may further include an organic binder as long as the object of the disclosed technology is achieved.

Specifically, the organic binder may be included at 5 parts by weight or less with respect to a total of 100 parts by weight of the first inorganic particles, the second inorganic particles, and the organic binder. More specifically, the organic binder may be included at 3 parts by weight or less or 1 part by weight or less with respect to a total of 100 parts by weight of the first inorganic particles, the second inorganic particles, and the organic binder, and its lower limit may be 0.1 parts by weight, but is not limited thereto. If the content of the organic binder satisfies the range, the heat resistance and the adhesive strength of the separator may be further improved, and problems such as pore blockage by the organic binder, an increased resistance increase rate, and deteriorated electrical properties by a chemical reaction and the like may be further prevented.

In particular, if the content of the organic binder satisfies the range, regarding the physical properties of a slurry including the first inorganic particles, the second inorganic particles, and the organic binder, a particle diameter (D50) increase rate of particles in the slurry and a slurry viscosity increase rate are measured to be low, so that the physical properties of the slurry may be maintained better for a long time, and a standard deviation increase rate of the thickness of the inorganic particle layer formed by coating the slurry on the porous substrate is also measured to be lower, so that coating uniformity may be maintained better. The uniformity may further improve the heat resistance of the separator and the uniformity of adhesive strength, and the electrical properties of a battery may be further improved by the uniformity of gas permeability. Here, the diameter refers to D50 which is a particle diameter corresponding to 50% of a total volume when the particle diameter of the inorganic particles is measured and the volume is accumulated from the small particles.

More specifically, if the content of the organic binder satisfies the range, when the slurry is allowed to stand at room temperature for 24 hours, the particle diameter (D50) increase rate of particles in the slurry may be 1.5% or less, specifically 1% or less, and the viscosity increase rate of the slurry may be 1% or less, specifically 0.5% or less. In addition, when the separator including the inorganic particle layer formed by coating the slurry is allowed to stand at room temperature for 24 hours, the standard deviation increase rate of the thickness of the inorganic particle layer may be 2% or less, specifically 1% or less, but is not necessarily limited thereto.

In addition, the organic binder may be included at 0.1 parts by weight to 10 parts by weight with respect to 100 parts by weight of the second inorganic particles. In addition, since the organic binder is included at 0.1 parts by weight to 10 parts by weight with respect to 100 parts by weight of the second inorganic particles, it may be included at 5 parts by weight, 3 parts by weight, or 1 part by weight or less with respect to a total of 100 parts by weight of the first inorganic particles, the second inorganic particles, and the organic binder.

More specifically, the content of the organic binder may be 0.1 parts by weight to 5 parts by weight, specifically 0.1 parts by weight to 3 parts by weight with respect to 100 parts by weight of the second inorganic particles. Likewise, since the content of the organic binder is 0.1 parts by weight to 5 parts by weight, specifically 0.1 parts by weight to 3 parts by weight with respect to 100 parts by weight of the second inorganic particles, it is preferred that the organic binder may be included at 5 parts by weight or less, 3 parts by weight or less, or 1 part by weight or less with respect to a total of 100 parts by weight of the first inorganic particles, the second inorganic particles, and the organic binder, but it is not necessarily limited thereto.

In some embodiments of the disclosed technology, the organic binder refers to a binder known in the art, and may include a polymer-based organic binder known in the art such as an ester-based polymer, an amide-based polymer, an imide-based polymer, an acryl-based polymer, a styrene-based polymer, a vinyl alcohol-based polymer, a vinylpyrrolidone-based polymer, a cellulose-based polymer, and a fluorine-based polymer, or refers to a crosslinkable compound which is crosslinked to serve as a binder, such as a silane compound having a reactive group, or metal alkoxide or metal alkanoate having a polar group, but is not limited thereto.

Specifically, the ester-based polymer may be selected from polyethylene terephthalate, polyethylene naphthalate (PEN), and the like, the amide-based polymer may be selected from polyamide-6, polyamide-66, and the like, the imide-based polymer may be selected from polyimide, polyether imide, polyester imide, and the like, and the acryl-based polymer may be selected from polyacrylamide, polymethacrylate, polyethylacrylate, polyacrylate, polybutylacrylate, sodium polyacrylate, acrylic acid-methacrylic acid copolymer, and the like. The styrene-based polymer may be selected from polystyrene, polyalphamethylstyrene, polybromostyrene, and the like. The vinylalcohol-based polymer may be selected from polyvinylalcohol, polyvinylacetate, a polyvinylacetate-polyvinylalcohol copolymer, and the like. The vinylpyrrolidone-based polymer may be selected from copolymers including polyvinylpyrrolidone and vinylpyrrolidone and the like. The cellulose-based polymer may be carboxymethyl cellulose, cellulose acetate propionate, cellulose acetate, cellulose acetate butylate, and the like, and the fluorine-based polymer may be, specifically, for example, any one or a mixture of two or more selected from polyvinylidene fluoride, polytetrafluoroethylene, polyhexafluoroethylene, hexafluoropropylene, polyfluoride-hexafluoropropylene, polychlorotrifluoroethylene, and the like, but is not limited thereto.

Specifically, the polymer-based organic binder described above may have a weight average molecular weight range of 5,000 to 3,000,000 g/mol, but is not limited thereto, and may have a glass transition temperature of 100° C. to 200° C., but is not limited thereto.

In addition, an example of a crosslinkable compound which is crosslinked to serve as a binder, such as a silane compound having a reactive group may be selected from, for example, 7-glycidoxypropyltrimethoxysilane, 7-glycidoxypropylmethyldiethoxysilane, β-(3,4-epoxydichlorohexyl) ethyltrimethoxysilane, 7-methacryloxypropyltrimethoxysilane, 7-methacryloxypropylmethyldimethoxysilane, and tetraethoxysilane (TEOS), but is not limited thereto.

In addition, the polar group of the metal alkanoate having a polar group may be any one or two or more selected from a hydroxyl group, a carbonyl group, amine group, and a thiol group, but is also not limited thereto, and as an example, it may be aluminum L-lactate, but is not limited thereto. Besides, since various organic binders used in this field may be used, the kind is not necessarily limited thereto.

In some embodiments of the disclosed technology, as the porous substrate, a porous polymer film, a sheet, woven fabric, a non-woven fabric, and the like manufactured from a polymer used as a separator may be variously used, and also, a porous substrate having a laminated structure in which each layer is laminated in two or more layers may be included.

The material of the porous substrate is not particularly limited as long as it is a polymer material used in a secondary battery field, and for example, may be a porous polyolefin-based substrate. Specifically, it may be a porous film, a sheet, of a non-woven fabric form, and the like manufactured from low-density polyethylene, linear low-density polyethylene, high-density polyethylene, ultra-high molecular weight polyethylene, polypropylene, the copolymer or a derivative thereof, but is not limited thereto.

By way of example and not limitation, the thickness of the porous substrate may be in a range of 1 μm to 100 μm, specifically 5 μm to 60 μm, and more specifically 5 μm to 30 μm. In addition, as to the pore size and the porosity of the porous substrate, for example, the pore size (diameter) may be in a range of 0.01 μm to 20 μm, specifically 0.05 μm to 2 μm and the porosity may be 5% to 95%, specifically 30% to 60%, but are not necessarily limited thereto.

In some embodiments of the disclosed technology, as long as the inorganic particle layer has pores formed by inorganic particles including the first inorganic particles and the second inorganic particles being adjacent to each other, the thickness is not particularly limited, but may be in a range of 0.01 μm to 50 μm.

In some embodiments of the disclosed technology, the pore size and the porosity of the separator are determined by the diameter of the first inorganic particles and the size of the second inorganic particles and are not particularly limited, but for example, may be in a range of 0.001 μm to 10 μm and 5% to 95%, respectively.

In some embodiments of the disclosed technology, the thickness of the separator is not particularly limited, and for example, in a range of 5 μm to 100 μm, specifically 10 μm to 50 μm.

The separator based on some embodiments is disposed on one or both surfaces of the porous substrate, and by adopting the inorganic particle layer including the first inorganic particles having fluorescence properties, has a significantly low heat shrinkage rate at a high temperature to improve heat resistance.

For example, the separator may have a heat shrinkage rate (%) at 170° C. of 10% or less. Specifically, the separator may have a heat shrinkage rate at 170° C. of 8% or less, 5% or less, or 3% or less, and the lower limit is not limited thereto, but may be 0.01% or 0.1%. In addition, the separator may have a heat shrinkage rate at 130° C. of 5% or less, 3% or less, 1% or less, or 0.5% or less, and the lower limit may be 0.001% or 0.01%. In addition, the separator may have a heat shrinkage rate at 150° C. of 10% or less, 5% or less, 3% or less, or 1.5% or less, and the lower limit may be, for example, 0.001% or 0.01%.

The heat shrinkage rate may be calculated by the following Equation 2, after allowing a separator of 10 cm×10 cm marked with a TD direction to stand at 150° C., 160° C., and 170° C. for 1 hours, respectively and measuring an area reduction rate.

$$\text{Heat shrinkage rate (\%) in TD direction} = ((\text{length before heating} - \text{length after heating})/\text{length before heating}) \times 100 \qquad \text{[Equation 2]}$$

In addition, the Gurley permeability variation of the separator may satisfy the following Equation 3. The Gurley permeability variation satisfies the following Equation 3, thereby implementing the desired physical properties of the separator of the disclosed technology.

$$G_1 - G_2 \leq 70 \qquad \text{[Equation 3]}$$

wherein $G_1$ is a Gurley permeability of the separator, $G_2$ is a Gurley permeability of the porous substrate itself, and the unit is sec/100 cc. The Gurley permeability may be a time required for 100 cc of air to pass through a separator area of 1 square inch, measured in seconds, in accordance with ASTM D726.

In addition, the separator may have improved adhesive strength properties between the porous substrate and the inorganic particle layer and between inorganic particles of the inorganic particle layer.

For example, the separator may have a weight change rate (%) of the inorganic particle layer of 10% or less by a strawboard adhesion test. Specifically, the weight change rate (%) of the inorganic particle layer by the strawboard adhesion test may be 8% or less or 5% or less. The separator satisfies the weight change rate of the inorganic particle layer by the strawboard adhesion test in the above range, thereby having excellent adhesive strength to improve stability.

The strawboard adhesion test is performed by placing a black strawboard having a size of 2 cm×10 cm on a separator having a size of 5 cm×10 cm, pulling the strawboard horizontally at a speed of 0.1 m/s in a state of pressing the strawboard with a force of 10 N, and evaluating the amount of particles sticking to the strawboard at that time.

The weight change rate (%) of the inorganic particle layer may be calculated by the following Equation 4:

$$\text{Weight change rate (\%) of inorganic particle layer} = ((\text{weight of inorganic particle layer before strawboard adhesion test} - \text{weight of inorganic particle layer after strawboard adhesion test})/\text{weight of inorganic particle layer before strawboard adhesion test}) \times 100 \qquad \text{[Equation 4]}$$

In addition, the separator may have a peel strength between the porous substrate and the inorganic particle layer of 25 gf/15 mm or more. The determination of the peel strength is by a 1800 peel test method according to the industrial standard ASTM D903. Specifically, the peel strength may be 30 gf/15 mm or more, 40 gf/15 mm or more, 50 gf/15 mm or more, 70 gf/15 mm or more, or 80 gf/15 mm or more, and its upper limit is not limited, but may be 300 gf/15 mm or less or 200 gf/15 mm or less. If the peel strength satisfies the range, a separator which has improved stability with excellent adhesive strength between the porous substrate and the inorganic particle layer may be provided.

Hereinafter, an electrochemical device based on some embodiments of the disclosed technology will be described.

The separator may be used in an electrochemical device, for example, a separator of a lithium secondary battery. The electrochemical device is not particularly limited, but, for example, may be a primary battery, a secondary battery, a fuel battery, a capacitor, and the like.

The electrochemical device based on some embodiments may include a positive electrode, a negative electrode, the separator described above, and an electrolyte. When the separator is usually used in a battery, a negative electrode, a separator, and a positive electrode are arranged and assembled, which follows a general manufacturing method of injecting an electrolyte solution for completion, and thus, it will not be described any more in detail.

The positive electrode of the disclosed technology can include any material that used as a positive electrode of a secondary battery, and, for example, may be a lithium magnesium oxide, a lithium cobalt oxide, a lithium nickel oxide, or a composite oxide formed by a combination thereof, and the like.

The negative electrode active material is not limited as long as it is a common negative electrode active material used as a negative electrode of a secondary battery, and for example, may be a lithium metal, activated carbon, carbon-based materials such as graphite, and the like.

Each of the positive electrode active material and the negative electrode active material is used by binding the materials to a positive electrode current collector or a negative electrode current collector, respectively. As the positive electrode current collector, an aluminum foil, a nickel foil, and the like may be used, and the negative electrode current collector may be selected from copper, nickel, and the like, but since any material may be used without limitation as long as it is commonly used, it is not limited thereto.

Since the electrolyte solution used in the disclosed technology is not limited as long as it is used in the art, it will not be described any more in some implementations.

Hereinafter, a method of manufacturing a separator based on some embodiments of the disclosed technology will be described in detail.

The separator based on some embodiments of the disclosed technology may be manufactured by mixing the first inorganic particles and the second inorganic particles and dispersing the mixture in a solvent to prepare an inorganic particle dispersion, coating a porous substrate with the dispersion, and drying the porous substrate. Here, the second inorganic particles may be dispersed well by the first inorganic particles without an organic binder or with a small amount of the organic binder.

That is, when an inorganic particle dispersion is prepared in a conventional organic/inorganic composite separator, it is impossible to disperse inorganic particles without the use of an excessive amount of an organic binder, and also, even in the case of preparing a dispersion by applying an excessive force, adhesive strength between inorganic particles or between inorganic particles and a porous substrate is very poor, the separator does not function.

However, in the method of manufacturing a separator based on some embodiments of the disclosed technology, the first inorganic particles and the second inorganic particles or particles including the second inorganic particles are mixed and dispersed, and the particles may be dispersed very well as in the case of conventionally using an excessive amount of the organic binder, and simultaneously, problems with the use of an excessive amount of the organic binder may be solved.

Therefore, when an inorganic particle layer is laminated by coating one or both surfaces of a porous substrate with the dispersion, adhesive strength with the porous substrate and adhesive strength between particles are excellent.

The method of manufacturing a separator based on some embodiments of the disclosed technology may include: coating one or both surfaces of a porous substrate with a dispersion including first inorganic particles and second inorganic particles; and drying the coated porous substrate to form an inorganic particle layer.

Specifically, the method of manufacturing a separator based on some embodiments of the disclosed technology may include: a first step of dispersing first inorganic particles in a solution to prepare a dispersion; a second step of dispersing second inorganic particles or particles including the second inorganic particles in the dispersion of the first step to prepare a dispersion; and a third step of coating the entire surface or a part of the surface of a porous substrate film with the dispersion prepared in the second step and drying the film to form an inorganic particle layer.

In addition, the method of manufacturing a separator based on some embodiments of the disclosed technology may include: adding first inorganic particles and second inorganic particles to a solution simultaneously and dispersing the particles in the solution to prepare a dispersion; and coating the entire area or a part of the area of a porous substrate film with the dispersion and drying the film.

As a dispersion medium (solvent) of the dispersion forming the inorganic particle layer, water may be mainly used, and as other dispersion media (solvents), organic solvents, for example, lower alcohol such as ethanol, methanol, and propanol, dimethylformamide, acetone, tetrahydrofuran, diethylether, methylene chloride, DMF, N-methyl-2-pyrrolidone, hexane, and cyclohexane, or a mixture thereof may be used, but the disclosed technology is not limited thereto.

It is preferred to crush an aggregate of the second inorganic particles in the dispersion prepared by mixing the second inorganic particles or particles including the second inorganic particles and the first inorganic particles in the dispersion medium (solvent), using a ball mill, a beads mill, a planetary mixer (pulverization and mixing method by revolution/rotation), and the like. Here, a crushing time is not limited as long as the aggregate is sufficiently crushed, and for example, it may be 0.01 hours to 20 hours, and the particle size of the crushed second inorganic particles may be in the range of 0.001 μm to 10 μm, but they are not necessarily limited thereto.

The porous separator having the inorganic particle layer on one or both surfaces of the porous substrate may be obtained by coating the porous substrate with the dispersion and drying the porous substrate. Specifically, a polyolefin-based porous substrate film is coated with the dispersion and dried, thereby obtaining the separator of the disclosed technology.

Though the coating method is not particularly limited, the dispersion may be coated by, for example, various methods such as knife coating, roll coating, and dip coating.

In some embodiments of the disclosed technology, an organic binder may be further included, and in this case, the separator may be manufactured by using a solvent in which the organic binder is dissolved.

Since the first inorganic particles, the second inorganic particles, and the organic binder are as described above for the separator, the detailed description thereof will be omitted.

For example, the first inorganic particles may have a fluorescence retention rate represented by the following Equation 1 of 85% or more:

$$\text{Fluorescence retention rate (\%)} = I_{100}/I_0 \times 100 \qquad \text{[Equation 1]}$$

wherein $I_0$ is a maximum fluorescence intensity in the range of 600 nm to 750 nm which is detected when a solution obtained by diluting an upper 10 vol % of aliquot of an aqueous slurry including 5 wt % of the first inorganic particles by a dilution factor of 500 is irradiated with an incident light having a wavelength in a range of 300 nm to 350 nm, and $I_{100}$ is a maximum fluorescence intensity in the range of 600 nm to 750 nm which is detected when a solution obtained by allowing the slurry to stand for 100 hours and then diluting an upper 10 vol % of aliquot of the slurry by a dilution factor of 500 is irradiated with an incident light having a wavelength in a range of 300 nm to 350 nm.

Hereinafter, a method of selecting inorganic particles for a separator according to another exemplary embodiment will be described.

An exemplary embodiment may provide a method of selecting inorganic particles for a separator including: measuring a fluorescence retention rate represented by Equation 1; and selecting inorganic particles having a fluorescence retention rate of 85% or more as inorganic particles for a separator.

As described above, the separator based on some embodiments adopts an inorganic particle layer which is disposed on one or both surfaces of a porous substrate and includes inorganic particles having specific fluorescence properties, thereby having improved heat resistance to prevent ignition or rupture by an abnormal phenomenon such as a rapid temperature rise, and having excellent adhesive strength between the porous substrate and the inorganic particle layer and between the inorganic particles of the inorganic particle layer. The inorganic particles for a separator which may significantly improve heat resistance and adhesion may be easily adopted, using the fact that the inorganic particles have specific fluorescence properties.

Hereinafter, preferred examples are presented in order to help a better understanding of the disclosed technology, however, the following examples are only illustrative of the disclosed technology, and do not limit the scope of the disclosed technology.

[Method of Evaluating Physical Properties]
1. Evaluation of Heat Shrinkage Rate

A separator of 10 cm×10 cm marked with a TD direction was allowed to stand at 150° C., 160° C., and 170° C. for 1 hour each, and then an area reduction rate was measured to calculate a heat shrinkage rate in a TD direction by the following Equation Formula 2:

Heat shrinkage rate (%) in TD direction=((length before heating−length after heating)/length before heating)×100  [Equation 2]

2. Evaluation of Gurley Permeability Variation

A Gurley permeability is a time required for 100 cc of air to pass through a separator area of 1 square inch, measured in seconds, in accordance with the standard of ASTM D726, using a densometer available from Toyoseiki, and a Gurley permeability variation (ΔGurley permeability) was calculated by the following Equation 5:

Gurley permeability variation (sec/100 cc)=Gurley permeability of separator ($G_1$)−Gurley permeability of porous substrate ($G_2$)  [Equation 5]

3. Strawboard Adhesion Test

The strawboard adhesion test is performed by placing a black strawboard having a size of 2 cm×10 cm (Doosung Paper, weight: 180 g/m², black) on a separator having a size of 5 cm×10 cm, pulling the strawboard horizontally at a speed of 0.1 m/s in a state of pressing the strawboard with a force of 10 N, and evaluating the amount of particles sticking to the strawboard at that time.

Specifically, a weight change rate (%) of the inorganic particle layer by the strawboard adhesion test was calculated by the following Equation 4:

Weight change rate (%) of inorganic particle layer= ((weight of inorganic particle layer before strawboard adhesion test−weight of inorganic particle layer after strawboard adhesion test)/ weight of inorganic particle layer before strawboard adhesion test)×100  [Equation 4]

4. Evaluation of Peel Strength

A tensile measurement device (3343) available from INSTRON was used to measure a peel strength between a porous substrate and an inorganic particle layer by a 1800 peel test method (ASTM D903).

5. Analysis of Fluorescence Properties

Using a fluorescence spectrophotometer (Hitachi, F-7000), a light of 650 nm to 700 nm occurring by irradiating with a light of 332 nm was detected in a fluorescence spectrum.

In addition, particles prepared in the following preparation examples and inorganic particles having an average particle diameter of 80 nm used in the comparative examples were prepared as a 5 wt % aqueous dispersion, an aqueous solution obtained by sampling a 10 vol % aliquot of the aqueous dispersion and diluting the liquid by a dilution factor of 500 was irradiated with a light of 332 nm, and a maximum fluorescence intensity at a peak wavelength was measured. The fluorescence intensity measured at this time is referred to as an initial fluorescence intensity ($I_0$) of the aqueous dispersion.

The 5 wt % aqueous dispersion prepared above was allowed to stand for 100 hours, a 10 vol % aliquot was sampled and diluted by a dilution factor of 500 to obtain a solution, the solution was irradiated with a light of 332 nm, a maximum fluorescence intensity ($I_{100}$) at the wavelength was measured, and the fluorescence intensity measured at this time is referred to as a fluorescence intensity ($I_{100}$) after allowing the aqueous dispersion to stand for 100 hours. Thereafter, a fluorescence retention rate was determined by the following Equation 1:

Fluorescence retention rate (%)=$I_{100}/I_0$×100  [Equation 1]

Preparation Example 1

306 g of aluminum isopropoxide (Sigma Aldrich) was dissolved in 1600 g of water to prepare an aluminum precursor solution. The aluminum precursor solution was heated to 95° C. while decreasing the pressure to 500 mbar to remove isopropyl alcohol which was the by-product of the condensation reaction in the solution. 28 g of acetic acid was added to the aluminum precursor solution from which isopropyl alcohol had been removed, and the pH was adjusted to 3.3. The aluminum precursor solution having a pH of 3.3 was heated at 5° C./min in a pressurized reactor to set the reaction temperature to 150° C. and then the reaction was performed with stirring for 6 hours. The solution after completing the reaction was naturally cooled to prepare pseudo-boehmite particles.

The length and the diameter of the pseudo-boehmite particles prepared above were determined from averages of the values measured by randomly selecting 5 transmission electron microscopic images using a transmission electron microscopy (TEM), and randomly selecting 20 particles in each image. It was confirmed that the length and the diameter were 55 nm and 6 nm, respectively, and the particles were a rod shape. The fluorescence properties of the particles prepared above are listed in FIG. 1 and Table 1.

Preparation Example 2

The particles were prepared in the same manner as in Preparation Example 1, except that 10 g of lactic acid was added to the aluminum precursor solution from which isopropyl alcohol had been removed and the pH was adjusted to 4.5, the aluminum precursor solution of pH 4.5 was heated at 5° C./min to set the reaction temperature to 180° C., and then the reaction was performed while performing stirring for 6 hours.

As a result of performing measurement in the same manner as in Preparation Example 1, it was confirmed that the particles were a rectangular sheet shape having a long diameter of 20 nm, a short diameter of 10 nm, and a thickness of 5 nm, and the fluorescence properties of the prepared particles are listed in Table 1.

TABLE 1

| Classification | $I_0$ | $I_{100}$ | $I_{100}/I_0$ |
|---|---|---|---|
| Preparation Example 1 | 1817 | 1745 | 0.96 |
| Preparation Example 2 | 2013 | 1888 | 0.94 |
| Boehmite having average diameter of 170 nm | 4815 | 0 | 0 |
| Boehmite having average diameter of 80 nm | 5502 | 4639 | 0.84 |

Example 1

92 parts by weight of boehmite having an average particle diameter of 170 nm (D50: 170 nm) having the properties shown in Table 1 and 8 parts by weight of the particles of Preparation Example 1 were added to water to prepare a dispersion having a solid content of 15 wt %.

Both surfaces of a polyethylene film (porosity: 41%) having a thickness of 9 μm was bar coated with the dispersion prepared above and dried to form an inorganic particle layer. The thickness of the inorganic particle layer on each surface was 2 μm. The average pore and porosity of the produced separator was 0.04 μm and 45%, respectively, and the porosity of the inorganic particle layer was 56%.

The results of measuring the total thickness, the heat shrinkage rate, the Gurley permeability variation, and the peel strength of the inorganic particle layer of the manufactured separator are listed in Table 2.

Example 2

The process was performed in the same manner as in Example 1, except that boehmite having an average particle diameter of 170 nm (D50: 170 nm) having the properties shown in Table 1 and the particles of Preparation Example 1 were added at a weight ratio of 85:15. The average thickness of the prepared inorganic particle layer was 2 μm and the physical properties of the manufactured separator are listed in Table 2.

Example 3

The process was performed in the same manner as in Example 1, except that the particles of Preparation Example 2 were used instead of the particles of Preparation Example 1. The average thickness of the prepared inorganic particle layer was 2 μm and the physical properties of the manufactured separator are listed in Table 2.

Example 4

The process was performed in the same manner as in Example 1, except that boehmite having an average particle diameter of 170 nm (D50: 170 nm) having the properties shown in Table 1 and the particles of Preparation Example 2 were added at a weight ratio of 85:15. The average thickness of the prepared inorganic particle layer was 2 μm and the physical properties of the manufactured separator are listed in Table 2.

Comparative Example 1

The process was performed in the same manner as in Example 1, except that boehmite having an average particle diameter of 80 nm (D50: 80 nm) having the properties (fluorescence retention rate according to Equation 1: 84%) shown in Table 1 were used instead of the particles of Preparation Example 1. The average thickness of the prepared inorganic particle layer was 2 μm and the physical properties of the manufactured separator are listed in Table 2.

Comparative Example 2

The process was performed in the same manner as in Comparative Example 1, except that boehmite having an average particle diameter of 170 nm (D50: 170 nm) having the properties shown in Table 1 and boehmite having an average particle diameter of 80 nm (D50: 80 nm) having the properties shown in Table 1 were added at a weight ratio of 85:15. The average thickness of the prepared inorganic particle layer was 2 μm and the physical properties of the manufactured separator are listed in Table 2.

TABLE 2

| | Physical properties of separator | | | | | | |
|---|---|---|---|---|---|---|---|
| | Average thickness | Heat shrinkage rate (%) (TD direction) | | | ΔGurley permeability | Strawboard adhesion test Weight change rate (%) of inorganic | Peel strength |
| composition | (μm) | 130° C. | 150° C. | 170° C. | sec/100 cc | particle layer | Gf/15 mm |
| Example 1 | 4 | 0.1 | 1.2 | 2.0 | 56 | 4.2 | 89 |
| Example 2 | 4 | 0.1 | 1.0 | 1.8 | 62 | 2.9 | 105 |
| Example 3 | 4 | 0.1 | 1.4 | 2.2 | 57 | 3.8 | 94 |
| Example 4 | 4 | 0.1 | 1.1 | 1.9 | 63 | 2.8 | 109 |
| Comparative Example 1 | 4 | 2.4 | 52 | — | 51 | 11.6 | 11 |

TABLE 2-continued

| | Physical properties of separator | | | | | |
|---|---|---|---|---|---|---|
| composition | Average thickness (μm) | Heat shrinkage rate (%) (TD direction) | | | ΔGurley permeability sec/100 cc | Strawboard adhesion test Weight change rate (%) of inorganic particle layer | Peel strength Gf/15 mm |
| | | 130° C. | 150° C. | 170° C. | | | |
| Comparative Example 2 | 4 | 2.9 | 51 | — | 57 | 12.1 | 12 |

Referring to Table 2, it was confirmed that the separators of Examples 1 to 4 including the first inorganic particles having the fluorescence retention rate represented by Equation 1 of 85% or more had significantly low heat shrinkage rates to have excellent heat resistance, had significantly low Gurley permeability increase rates, had significantly low weight change rates of the inorganic particle layer by the strawboard adhesion test, and had very high peel strength to have significantly improved adhesion.

However, it was confirmed that the separators of Comparative Examples 1 and 2 including inorganic particles having the fluorescence retention rate represented by Equation 1 of less than 85% had very high heat shrinkage rates to have significantly deteriorated heat resistance, had very high weight change rates of the inorganic particle layer by the strawboard adhesion test, and had significantly low peel strength measured to have greatly deteriorated adhesion.

Accordingly, the separator according to the disclosed technology includes the first inorganic particles and the second inorganic particles on the porous substrate in which the first inorganic particles satisfy the fluorescence retention rate represented by Equation 1 of 85% or more, wherein the separator may show sufficient adhesion, Gurley permeability, and excellent heat shrinkage.

The separator according to the disclosed technology adopts an inorganic particle layer which is disposed on one or both surfaces of a porous substrate and includes inorganic particles having specific fluorescence properties, wherein the separator may have improved heat resistance to prevent ignition or rupture by an abnormal phenomenon such as a rapid temperature rise.

In addition, the separator according to the disclosed technology includes inorganic particles having specific fluorescence properties in an inorganic particle layer of the separator, wherein the separator may have excellent adhesive strength between a porous substrate and the inorganic particle layer and between inorganic particles of the inorganic particle layer.

In addition, the inorganic particles for a separator which may significantly improve heat resistance and adhesion may be easily adopted, using the fact that the inorganic particles have specific fluorescence properties.

In addition, the electrochemical device based on some embodiments of the disclosed technology includes the separator, thereby having chemically stable and excellent electrical properties.

Hereinabove, although the present disclosure has been described by the specific matters and limited exemplary embodiments in the present specification, the present disclosure is not limited to the exemplary embodiments, and various modifications and changes may be made to the disclosed embodiments and other embodiments may be made based on what is disclosed in this patent document.

What is claimed is:

1. A separator comprising: a porous substrate and an inorganic particle layer disposed on one or both surfaces of the porous substrate,
   wherein the inorganic particle layer includes first inorganic particles having a fluorescence retention rate of 85% or more and second inorganic particles having a fluorescence retention rate of less than 85%, and
   the fluorescence retention rate is expressed as:

$I_{100}/I_0 \times 100(\%)$, wherein $I_0$ is a maximum fluorescence intensity in the range of 600 nm to 750 nm which is detected when a solution obtained by diluting an upper 10 vol % of aliquot of an aqueous slurry including 5 wt % of the first inorganic particles by a dilution factor of 500 is irradiated with an incident light having a wavelength in the range of 300 nm to 350 nm, and
   $I_{100}$ is a maximum fluorescence intensity in the range of 600 nm to 750 nm which is detected when a solution obtained by allowing the slurry to stand for 100 hours and then diluting an upper 10 vol % of aliquot of the slurry by a dilution factor of 500 is irradiated with an incident light having a wavelength in the range of 300 nm to 350 nm,
   wherein the first inorganic particles include either or both of one or more sheet-shaped inorganic particles having a sheet shape and one or more rod-shaped inorganic particles having a rod shape, wherein the sheet-shaped inorganic particles have an average long diameter and an average short diameter in the range of 0.1 nm to 200 nm, respectively, and an average thickness in the range of 0.1 nm to 50 nm, and the rod-shaped inorganic particles have an average length in the range of 0.1 nm to 450 nm and an average diameter in the range of 0.1 nm to 100 nm,
   wherein the first inorganic particles have a predetermined surface contact with the second inorganic particles by including either or both of one or more sheet-shaped inorganic particles and one or more rod-shaped inorganic particles such that a range of the fluorescence retention rate of the first inorganic particles does not overlap a range of the fluorescence retention rate of the second inorganic particles,
   wherein the inorganic particle layer includes pores that are formed by connecting the second inorganic particles to each other by the first inorganic particles.

2. The separator of claim 1, wherein the first inorganic particles have a fluorescence in the wavelength region of 600 nm to 750 nm when irradiated to an incident light in the wavelength region of 300 nm to 350 nm in a solution phase.

3. The separator of claim 1, wherein the first inorganic particles include any one or a combination of two or more selected from metal, carbon, metal oxides, metal nitrides, metal carbides, metal carbonate, metal hydrides, and metal carbonitrides.

4. The separator of claim 1, wherein the first inorganic particles include one or a combination of two or more selected from boehmite, pseudo-boehmite, $Ga_2O_3$, SiC, $SiC_2$, quartz, NiSi, Ag, Au, Cu, Ag-Ni, ZnS, $Al_2O_3$, $TiO_2$, $CeO_2$, MgO, NiO, $Y_2O_3$, CaO, $SrTiO_3$, $SnO_2$, ZnO, and $ZrO_2$.

5. The separator of claim 1, wherein the second inorganic particles include any one or a combination of two or more selected from metal oxides, metal nitride, metal carbides, metal carbonates, metal hydroxide, and metal carbonitrides.

6. The separator of claim 1, wherein the second inorganic particles include one or a combination of two or more selected from boehmite, pseudo-boehmite, $Al_2O_3$, $TiO_2$, $CeO_2$, MgO, NiO, $Y_2O_3$, CaO, $SrTiO_3$, $SnO_2$, ZnO, and $ZrO_2$.

7. The separator of claim 1, wherein the second inorganic particles have a D50 value in a range of 0.001 μm to 20 μm.

8. The separator of claim 1, wherein the first inorganic particles are included at 0.1 parts by weight to 30 parts by weight with respect to 100 parts by weight of the second inorganic particles.

9. The separator of claim 1, wherein the separator has a heat shrinkage rate (%) at 170° C. of 10% or less.

10. The separator of claim 1,
wherein the separator has a weight change rate (%) of the inorganic particle layer of 10% or less by a strawboard adhesion test,
wherein the strawboard adhesion test is performed by: placing a black strawboard having a size of 2 cm×10 cm on a separator having a size of 5 cm×10 cm; pulling the strawboard horizontally at a speed of 0.1 m/s in a state of pressing the strawboard with a force of 10 N; and evaluating an amount of particles sticking to the strawboard at that time.

11. The separator of claim 1, wherein a peel strength between the porous substrate and the inorganic particle layer is 25 gf/15 mm or more.

12. The separator of claim 1, wherein the inorganic particle layer further includes an organic binder.

13. The separator of claim 12, wherein the organic binder is included at 5 parts by weight or less with respect to a total of 100 parts by weight of the first inorganic particles, the second inorganic particles, and the organic binder.

14. An electrochemical device comprising: a positive electrode, a negative electrode, the separator of claim 1, and an electrolyte.

15. The electrochemical device of claim 14, wherein the electrochemical device is a lithium secondary battery.

16. A method of manufacturing a separator, the method comprising:
coating one or both surfaces of a porous substrate with a dispersion including first inorganic particles having a fluorescence retention rate of 85% or more and second inorganic particles having a fluorescence retention rate of less than 85%; and
drying the coated porous substrate to form an inorganic particle layer,
wherein the fluorescence retention rate is expressed as:

$I_{100}/I_0 \times 100 (\%)$, wherein $I_0$ is a maximum fluorescence intensity in the range of 600 nm to 750 nm which is detected when a solution obtained by diluting an upper 10 vol % of aliquot of an aqueous slurry including 5 wt % of the first inorganic particles by a dilution factor of 500 is irradiated with an incident light having a wavelength in the range of 300 nm to 350 nm, and $I_{100}$ is a maximum fluorescence intensity in the range of 600 nm to 750 nm which is detected when a solution obtained by allowing the slurry to stand for 100 hours and then diluting an upper 10 vol % of aliquot of the slurry by a dilution factor of 500 is irradiated with an incident light having a wavelength of 300 nm to 350 nm, wherein the first inorganic particles include either or both of one or more sheet-shaped inorganic particles having a sheet shape and one or more rod-shaped inorganic particles having a rod shape, wherein the sheet-shaped inorganic particles have an average long diameter and an average short diameter in the range of 0.1 nm to 200 nm, respectively, and an average thickness in the range of 0.1 nm to 50 nm, and the rod-shaped inorganic particles have an average length in the range of 0.1 nm to 450 nm and an average diameter in the range of 0.1 nm to 100 nm, wherein the first inorganic particles have a predetermined surface contact with the second inorganic particles by including either or both of one or more sheet-shaped inorganic particles and one or more rod-shaped inorganic particles such that a range of the fluorescence retention rate of the first inorganic particles does not overlap a range of the fluorescence retention rate of the second inorganic particles, wherein the inorganic particle layer includes pores that are formed by connecting the second inorganic particles to each other by the first inorganic particles.

17. The method of claim 16, wherein the first inorganic particles include any one or a combination of two or more selected from metal, carbon, metal oxides, metal nitrides, metal carbides, metal carbonate, metal hydrides, and metal carbonitrides.

18. The method of claim 16, wherein the first inorganic particles include one or a combination of two or more selected from boehmite, pseudo-boehmite, $Ga_2O_3$, SiC, $SiC_2$, quartz, NiSi, Ag, Au, Cu, Ag-Ni, ZnS, $Al_2O_3$, $TiO_2$, $CeO_2$, MgO, NiO, $Y_2O_3$, CaO, $SrTiO_3$, $SnO_2$, ZnO, and $ZrO_2$.

19. The method of claim 16, wherein the second inorganic particles include any one or a combination of two or more selected from metal oxides, metal nitride, metal carbides, metal carbonates, metal hydroxide, and metal carbonitrides.

20. The method of claim 16, wherein the second inorganic particles include one or a combination of two or more selected from boehmite, pseudo-boehmite, $Al_2O_3$, $TiO_2$, $CeO_2$, MgO, NiO, $Y_2O_3$, CaO, $SrTiO_3$, $SnO_2$, ZnO, and $ZrO_2$.

* * * * *